US012800924B2

(12) United States Patent
Sugiyama et al.

(10) Patent No.: US 12,800,924 B2
(45) Date of Patent: Nov. 17, 2026

(54) DISPLAY DEVICE

(71) Applicant: Panasonic Automotive Systems Co., Ltd., Kanagawa (JP)

(72) Inventors: Keiji Sugiyama, Kyoto (JP); Ken'ichi Kasazumi, Osaka (JP); Satoshi Kuzuhara, Osaka (JP); Kazuhiro Minami, Osaka (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 264 days.

(21) Appl. No.: 18/893,302

(22) Filed: Sep. 23, 2024

(65) Prior Publication Data

US 2025/0013046 A1 Jan. 9, 2025

Related U.S. Application Data

(63) Continuation of application No. PCT/JP2023/005250, filed on Feb. 15, 2023.

(30) Foreign Application Priority Data

Mar. 31, 2022 (JP) ................................ 2022-059851

(51) Int. Cl.
*G02B 27/01* (2006.01)
*B60K 35/10* (2024.01)
(Continued)

(52) U.S. Cl.
CPC .......... *G02B 27/0103* (2013.01); *B60K 35/10* (2024.01); *B60K 35/23* (2024.01);
(Continued)

(58) Field of Classification Search
CPC .......................... G02B 27/0103; G02B 27/01; G02B 27/0172; G02B 5/32; B60K 35/10;
(Continued)

(56) References Cited

U.S. PATENT DOCUMENTS

2002/0015197 A1* 2/2002 Nakashima .............. G02B 5/32 359/1
2019/0250406 A1* 8/2019 Nakamura ......... G02B 27/0172
(Continued)

FOREIGN PATENT DOCUMENTS

JP 2021-528681 10/2021
WO 2022/180934 9/2022

OTHER PUBLICATIONS

Official Communication issued in International Patent Application No. PCT/JP2023/005250, dated May 9, 2023, along with an English translation thereof.
(Continued)

*Primary Examiner* — Mariam Qureshi
(74) *Attorney, Agent, or Firm* — Greenblum & Bernstein, P.L.C.

(57) ABSTRACT

A display device displays a virtual image by projecting an image onto a windshield provided on a vehicle and having a curved shape. The display device includes: an image generation device that generates light (image light) representing an image; and a light guide that includes an emission hologram element having a non-rectangular quadrilateral shape. The emission hologram element emits, toward the windshield, the light representing the image and propagating through the light guide.

11 Claims, 7 Drawing Sheets

(51) Int. Cl.
*B60K 35/23* (2024.01)
*B60K 35/60* (2024.01)

(52) U.S. Cl.
CPC .......... *B60K 35/60* (2024.01); *B60K 2360/23* (2024.01); *B60K 2360/336* (2024.01)

(58) Field of Classification Search
CPC .... B60K 35/23; B60K 35/60; B60K 2360/23; B60K 2360/336; B60K 35/00
See application file for complete search history.

(56) References Cited

U.S. PATENT DOCUMENTS

| | | | | |
|---|---|---|---|---|
| 2021/0096364 | A1 | 4/2021 | Kern | |
| 2021/0141224 | A1* | 5/2021 | Kern | G02F 1/011 |
| 2023/0018634 | A1* | 1/2023 | Mori | B60K 35/23 |
| 2023/0393395 | A1 | 12/2023 | Minami et al. | |

OTHER PUBLICATIONS

Official Action issued in Japanese patent application No. 2022-059851 dated Apr. 15, 2025, along with English-language translation.

* cited by examiner

DISPLAY DEVICE

CROSS REFERENCE TO RELATED APPLICATIONS

This is a continuation application of PCT International Application No. PCT/JP2023/005250 filed on Feb. 15, 2023, designating the United States of America, which is based on and claims priority of Japanese Patent Application No. 2022-059851 filed on Mar. 31, 2022.

FIELD

The present disclosure relates to a display device.

BACKGROUND

Patent Literature (PTL) 1 discloses a conventional device that generates virtual images. The device includes an image generation unit that generates an image, an optical unit that projects the image toward a curved windshield to generate a virtual image, and a light guide that has a rectangular emission hologram.

CITATION LIST

Patent Literature

PTL 1: Japanese Unexamined Patent Application Publication (Translation of PCT Application) No. 2021-528681

SUMMARY

However, the light guide according to PTL 1 can be improved upon.

In view of this, the present disclosure provides a display device capable of improving upon the above related art.

A display device according to one aspect of the present disclosure is a display device that displays a virtual image by projecting an image onto a display medium provided on a mobile body and having a curved shape, the display device including: an image generation device that generates light representing the image; and a light guide that includes a first hologram element having a non-rectangular quadrilateral shape, wherein the first hologram element emits, toward the display medium, the light representing the image and propagating through the light guide.

A display device according to one aspect of the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENT

Figure 1A:
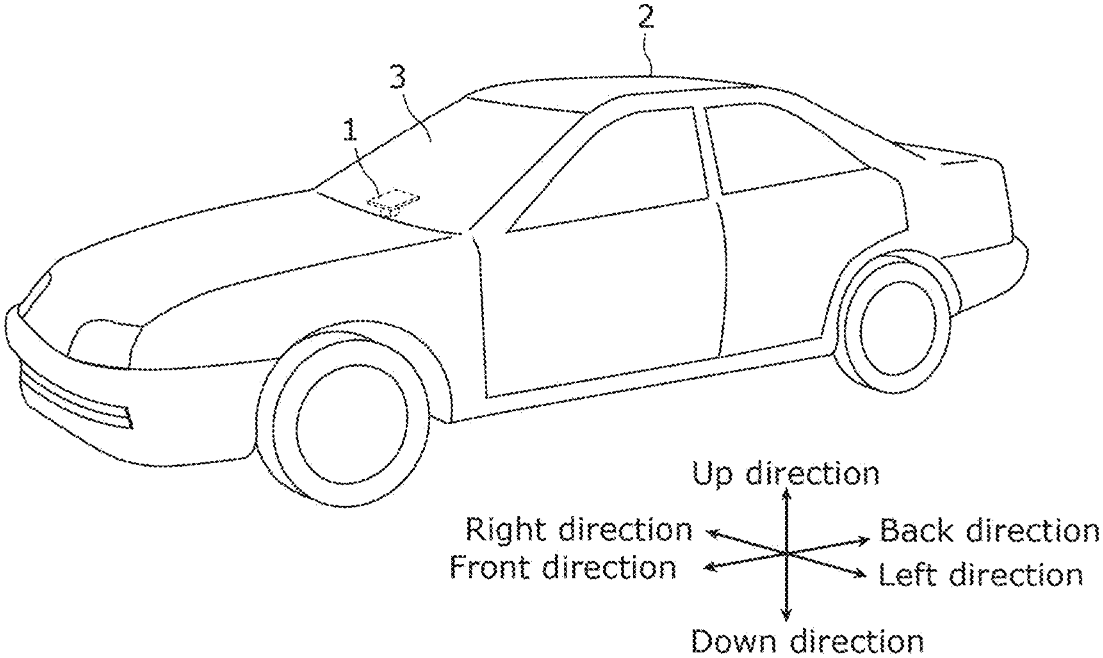
FIG. 1A is a schematic diagram illustrating an example of a vehicle on which a display device according to an embodiment is installed.

An embodiment will be described in detail below, with reference to the drawings.

The embodiment described below shows a general or specific example. The numerical values, shapes, materials, structural elements, the arrangement and connection of the structural elements, steps, the order of steps, etc. shown in the following embodiment are mere examples, and do not limit the scope of the present disclosure. Of the structural elements in the embodiment described below, the structural elements not recited in any one of the independent claims are described as optional structural elements.

Each drawing is a schematic, and does not necessarily provide precise depiction. In the drawings, the same structural elements are given the same reference marks.

In the following embodiment, expressions such as "approximately parallel" and "rectangular" are used. For example, the expressions "approximately parallel" and "rectangular" not only mean perfectly parallel and perfectly rectangular but also mean substantially parallel and substantially rectangular, including an error of about several percent. The expressions "approximately parallel" and "rectangular" mean parallel and rectangular to an extent that the advantageous effects of the present disclosure can be achieved. The same applies to other shapes and other expressions using "approximately".

Embodiment

<Structure>

First, the structure of display device 1 will be described with reference to FIGS. 1A to 4C.

Figure 1B:
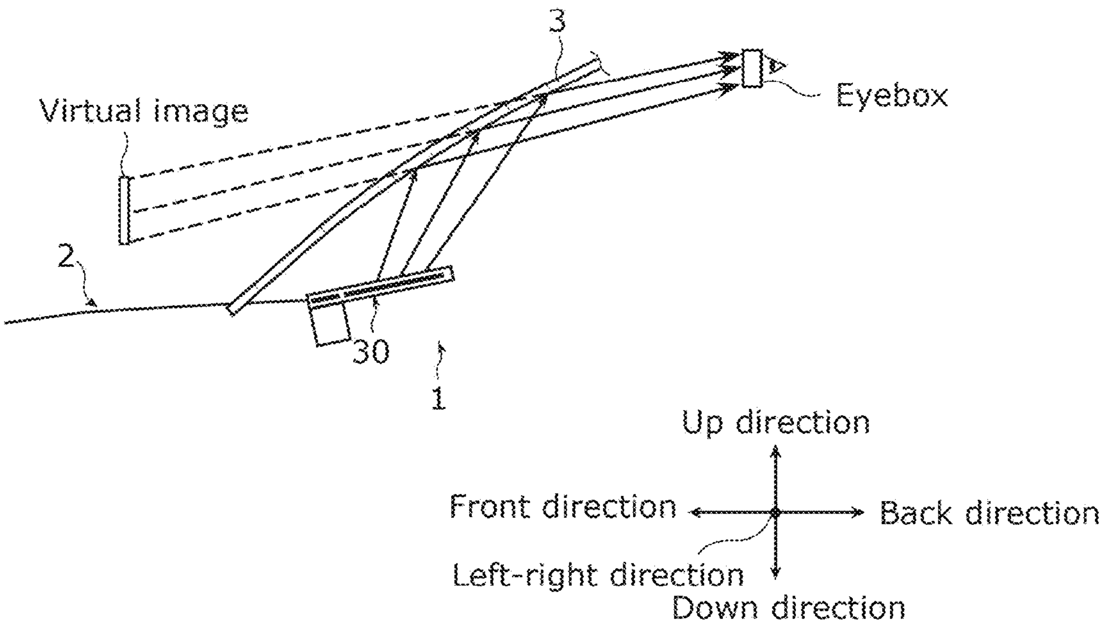
FIG. 1B is a schematic diagram illustrating the display device according to the embodiment and the vehicle as viewed in the right direction.
Figure 2:
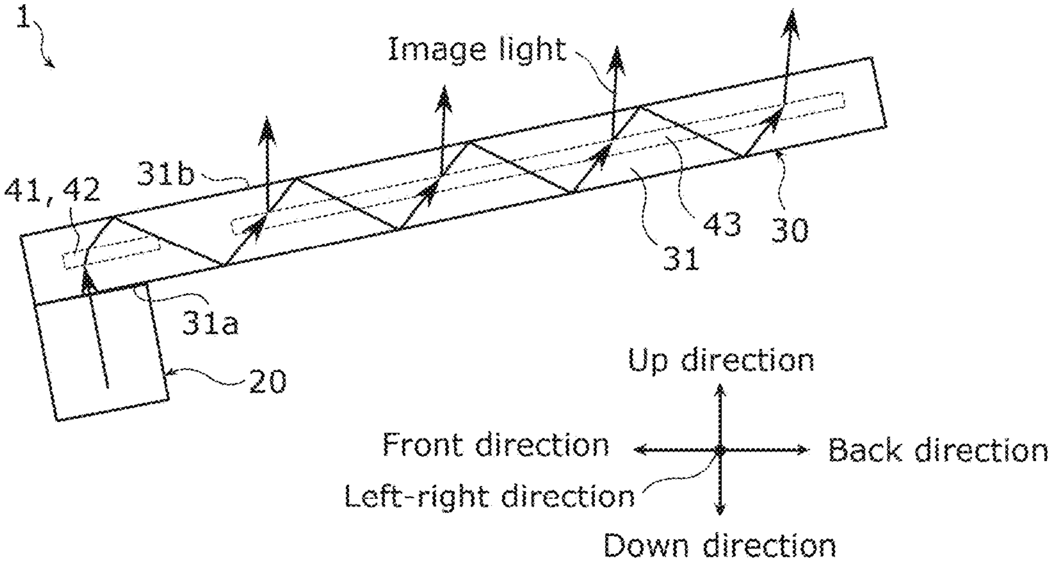
FIG. 2 is a diagram illustrating the display device according to the embodiment as viewed in the right direction.
Figure 3A:
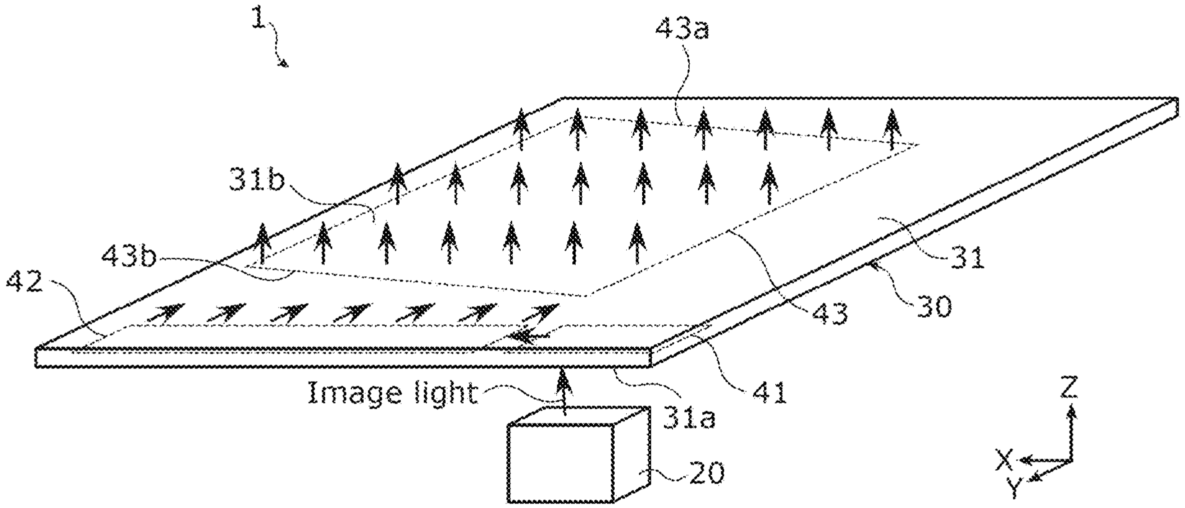
FIG. 3A is a perspective view illustrating the display device according to the embodiment.
Figure 3B:
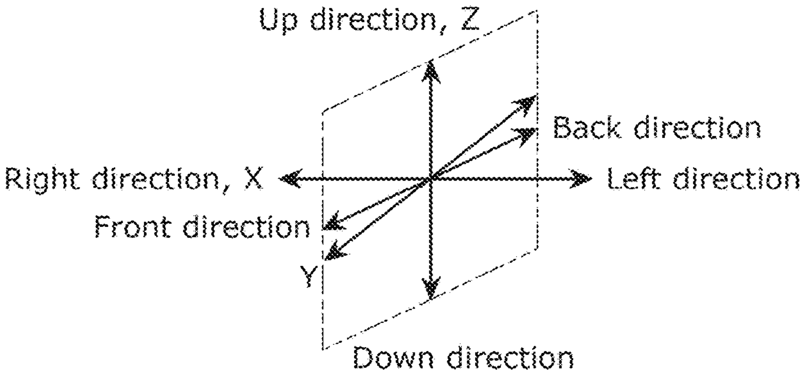
FIG. 3B is a diagram illustrating the correspondence between the left-right direction and the X-axis direction, the front-back direction and the Y-axis direction, and the up-down direction and the Z-axis direction.
Figure 4A:
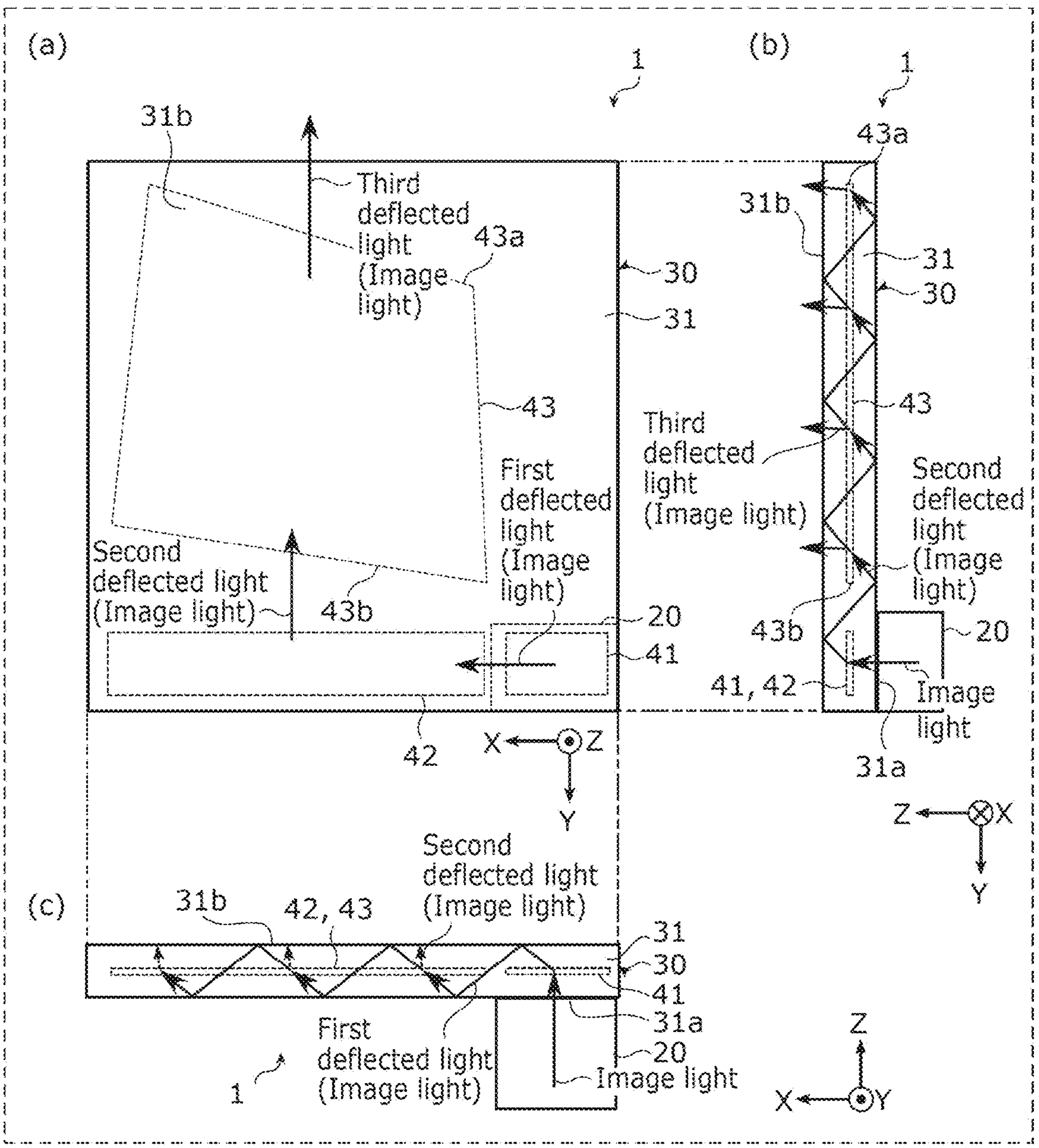
FIG. 4A is a diagram illustrating the display device.
Figure 4B:
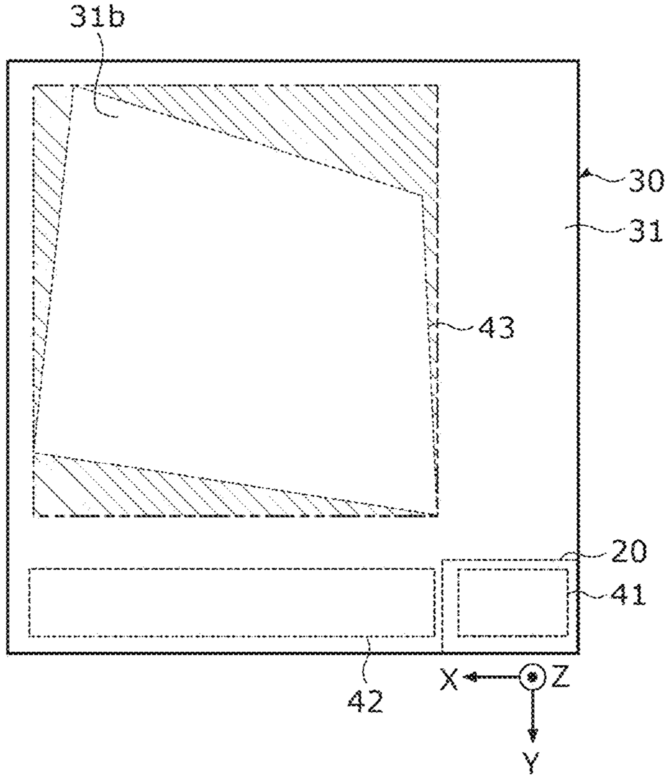
FIG. 4B is a diagram illustrating an emission hologram element according to the embodiment compared to a rectangular hologram element.
Figure 4C:
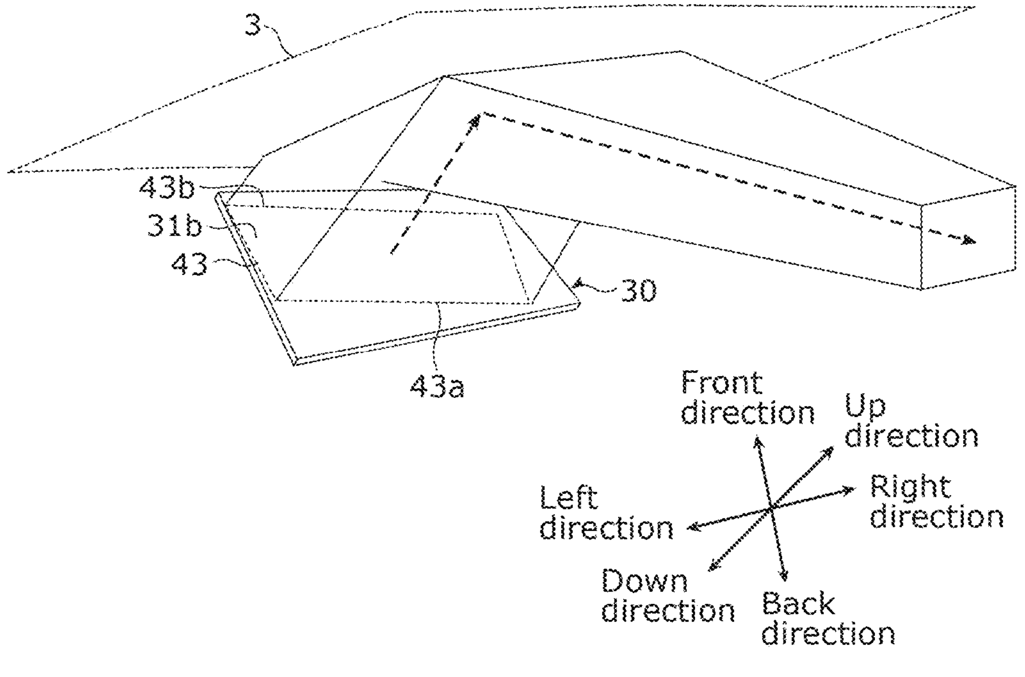
FIG. 4C is a diagram illustrating the shape and path of image light emitted from the display device.

FIG. 1A is a schematic diagram illustrating an example of vehicle 2 on which display device 1 according to the embodiment is installed. FIG. 1B is a schematic diagram illustrating display device 1 according to the embodiment and vehicle 2 as viewed in the right direction. FIG. 2 is a diagram illustrating display device 1 according to the embodiment as viewed in the right direction. FIG. 3A is a perspective view illustrating display device 1 according to the embodiment. FIG. 3B is a diagram illustrating the correspondence between the left-right direction and the X-axis direction, the front-back direction and the Y-axis direction, and the up-down direction and the Z-axis direction. FIG. 4A is a diagram illustrating display device 1. In FIG. 4A, (a) is a plan view of display device 1, (b) is a side view of display device 1, and (c) is a front view of display device 1. FIG. 4B is a diagram illustrating emission hologram element 43 according to the embodiment compared to a rectangular hologram element. FIG. 4C is a diagram illustrating the shape and path of image light emitted from display device 1. In FIG. 4C, how the image light travels is indicated by dashed arrows.

In FIG. 1A, the direction parallel to the entire length of vehicle 2 from the inside of vehicle 2 toward the outside of vehicle 2 through windshield 3 is the front (forward) direction. In other words, the front direction is the traveling direction of vehicle 2. The direction opposite to the front direction is the back (backward) direction. The direction orthogonal to the front direction and the back direction and parallel to the entire width of vehicle 2 is the left-right direction. In the left-right direction, the right hand side and left hand side of the user when the user looks forward from the inside of vehicle 2 are the right (rightward) direction and the left (leftward) direction respectively. The direction of light emitted from display device 1 toward windshield 3 and representing an image is the up (upward) direction. The direction opposite to the up direction is the down (downward) direction. In FIG. 3A, the direction in which folding hologram element 42 is located relative to incidence hologram element 41 is defined as the X-axis positive direction, the direction in which folding hologram element 42 is located relative to emission hologram element 43 as the Y-axis positive direction, and the direction in which incidence hologram element 41 is located relative to image generation device 20 as the Z-axis positive direction. FIG. 3B illustrates the correspondence between the left-right direction and the X-axis direction, the front-back direction and the Y-axis direction, and the up-down direction and the Z-axis direction. As illustrated in FIG. 3B, the Y-axis direction is inclined relative to the front-back direction with the X-axis direction as an axis, on a virtual plane indicated by the dash-dot-dot lines in the up-down direction and front-back direction. The Y-axis positive side (i.e. the positive side in the Y-axis direction) corresponds to the front side of display device 1, and the Y-axis negative side (i.e. the negative side in the Y-axis direction) corresponds to the back side of display device 1. The X-axis positive direction is approximately parallel to the right direction of display device 1, the X-axis negative direction is approximately parallel to the left direction of display device 1, the Z-axis positive direction is approximately parallel to the up direction of display device 1, and the Z-axis negative direction is approximately parallel to the down direction of display device 1. The correspondence in FIG. 3B applies to each drawing.

As illustrated in FIGS. 1A and 1B, display device 1 is disposed, for example, on a dashboard (also referred to as "instrument panel") of vehicle 2 such as an automobile. Windshield 3 (also referred to as "front shield") is located above the dashboard of vehicle 2. Light guide 30 of display device 1 is located between the dashboard and windshield 3. Light guide 30 has a structure in which diffraction optical elements are contained in light guide plate 31 having incidence surface 31*a* and emission surface 31*b*. The specific structure of light guide 30 will be described later. Windshield 3 is an example of the display medium.

Display device 1 can cause image light, i.e. light emitted from light guide 30 and representing an image, to enter the eyebox of a user such as a driver or a passenger, by reflecting the image light off windshield 3. In other words, by projecting an image represented by image light emitted from image generation device 20 in front of windshield 3, display device 1 can display a virtual image corresponding to the image on windshield 3. The image light is light representing an image, which is to be displayed as a virtual image in front of windshield 3. The image is a still image or a moving image, showing numbers, characters, figures, and the like.

As illustrated in FIGS. 1A and 2, display device 1 includes image generation device 20 and light guide 30.

<Image generation device 20>

Image generation device 20 can project a certain image onto windshield 3 through light guide 30 by emitting image light representing an image with a rectangular outline. Image generation device 20 can emit image light from a rectangular emission surface. The image light emitted from image generation device 20 enters and passes through light guide 30 and is then emitted from light guide 30 to be delivered to windshield 3. Thus, the image light is reflected off windshield 3, so that the image is projected onto windshield 3 to enable the user to recognize a virtual image.

Image generation device 20 includes a plurality of emitters, a plurality of dichroic mirrors, condensing lenses, mirrors, and an emission surface.

The plurality of emitters each emit a light ray that is light in a predetermined wavelength band different from the other emitters. The plurality of dichroic mirrors are each located on the light ray emitted by the corresponding emitter and capable of reflecting light rays in the predetermined wavelength band and transmitting light rays in the other wavelength bands. The condensing lenses are lenses that condense the light rays emitted through the dichroic mirrors onto a plurality of mirrors. The emission surface is a screen such as a microlens array or a liquid crystal display element such as a liquid crystal display (LCD) and, as a result of being irradiated with light rays in a plurality of wavelength bands from the mirror side, can emit transmitted light as image light.

Image generation device 20 may use a reflective liquid crystal element. In this case, as a result of the reflective liquid crystal element being irradiated with light rays in a plurality of wavelength bands, reflected light can be emitted as image light.

<Light Guide 30>

As illustrated in FIGS. 2, 3A, and 4A, light guide 30 is a hologram light guide that displays an image represented by image light to the user. Light guide 30 can stretch an image represented by image light emitted from image generation device 20 in the X-axis direction and the Y-axis direction and emit the stretched image.

Light guide 30 is shaped like a rectangular flat plate that is approximately parallel to the XY plane. Light guide 30 is located so that incidence surface 31*a* will face image generation device 20.

Light guide 30 includes light guide plate 31, incidence hologram element 41, folding hologram element 42, and emission hologram element 43.

Light guide plate 31 is translucent and is shaped like a rectangular flat plate that is approximately parallel to the XY plane. Light guide plate 31 has incidence surface 31*a* and emission surface 31*b*.

Incidence surface 31*a* is a surface on which image light emitted from the emission surface of image generation device 20 is incident. Incidence surface 31*a* is part of the rear surface of rectangular light guide plate 31, and is located at one of the four corners on the rear surface. The rear surface is the surface of light guide plate 31 opposite to emission surface 31*b*.

Emission surface 31*b* emits the image light that has entered from incidence surface 31*a* and propagated through light guide plate 31, toward windshield 3. Emission surface 31*b* faces windshield 3 and is a predetermined distance away from windshield 3. Emission surface 31*b* is part of the front surface of light guide plate 31.

Incidence hologram element 41 is a light-transmissive incidence diffraction optical element contained in light guide plate 31. Incidence hologram element 41 has a rectangular plate shape. Incidence hologram element 41 is an example of the second hologram element.

Incidence hologram element 41 and folding hologram element 42 are arranged side by side in the X-axis direction. Folding hologram element 42 and emission hologram element 43 are arranged side by side in the Y-axis direction.

Incidence hologram element 41 can emit first deflected light obtained by deflecting, by diffraction, the image light emitted from the emission surface of image generation device 20 in the Z-axis positive direction and incident on incidence surface 31*a*. Specifically, when the image light propagates inside light guide 30, incidence hologram element 41 deflects the image light by diffraction according to its diffraction efficiency to emit first deflected light (image light) guided in the X-axis positive direction. The first deflected light resulting from incidence hologram element 41 deflecting the image light by diffraction enters folding hologram element 42.

Folding hologram element 42 is a light-transmissive emission diffraction optical element contained in light guide plate 31. Folding hologram element 42 has a plate shape elongated in the X-axis direction. Folding hologram element 42 is an example of the third hologram element.

Folding hologram element 42 is located on the X-axis positive side (i.e. the positive side in the X-axis direction) of incidence hologram element 41 and the light emission side of incidence hologram element 41, and on the Y-axis positive side of emission hologram element 43 and the light incidence side of emission hologram element 43.

The first deflected light obtained as a result of incidence hologram element 41 deflecting the image light incident on the incidence surface by diffraction enters folding hologram element 42. Each time the first deflected light that has passed through incidence hologram element 41 enters (transmits to) folding hologram element 42, folding hologram element 42 emits, toward emission hologram element 43, second deflected light (image light) obtained by deflecting the incident first deflected light by diffraction. Specifically, when the first deflected light propagates inside light guide 30 in the X-axis positive direction, folding hologram element 42 deflects the first deflected light by diffraction according to its diffraction efficiency to emit second deflected light (image light) propagating in the Y-axis negative direction. Here, folding hologram element 42 functions to stretch the image of the image light in the X-axis direction. Folding hologram element 42 emits the second deflected light in the Y-axis negative direction. The second deflected light enters emission hologram element 43.

The diffraction efficiency of folding hologram element 42 may be set lower when it is closer to incidence hologram element 41 and higher when it is farther from incidence hologram element 41. This can improve the uniformity of the image displayed.

Emission hologram element 43 is a light-transmissive emission diffraction optical element contained in light guide plate 31. Emission hologram element 43 has a non-rectangular plate shape. Emission hologram element 43 is an example of the first hologram element.

Emission hologram element 43 is located on the Y-axis negative side relative to folding hologram element 42 so as to face the light incidence side of folding hologram element 42. Emission hologram element 43 is located so as to overlap and face emission surface 31*b* of light guide 30.

As illustrated in (a) in FIG. 4A, in a plan view of light guide 30, backmost side 43*a* located backmost (Y-axis negative side) of the four sides of emission hologram element 43 is inclined relative to the left-right direction. In other words, backmost side 43*a* closest to the user from among the four sides of emission hologram element 43 is inclined relative to the X-axis direction and also inclined relative to the edge of light guide plate 31 on the Y-axis negative side.

Specifically, in a plan view of emission hologram element 43, backmost side 43*a* is inclined clockwise relative to the left-right direction when an image is projected onto windshield 3 on the right side of vehicle 2. In other words, when display device 1 is located on the right side of vehicle 2, backmost side 43*a* is inclined clockwise relative to the left-right direction.

In a plan view of emission hologram element 43, backmost side 43*a* is inclined counterclockwise relative to the left-right direction when an image is projected onto windshield 3 on the left side of vehicle 2. In other words, when display device 1 is located on the left side of vehicle 2, backmost side 43*a* is inclined counterclockwise relative to the left-right direction.

Frontmost side 43*b* is inclined in the same direction as backmost side 43*a* relative to the left-right direction. In other words, frontmost side 43*b* located frontmost of the four sides of emission hologram element 43 is inclined relative to the left-right direction and also inclined relative to the longitudinal direction of folding hologram element 42. FIG. 3A, etc. illustrate an example in which frontmost side 43*b* and backmost side 43*a* are inclined clockwise relative to the left-right direction.

The second deflected light emitted from folding hologram element 42 enters emission hologram element 43. Each time the second deflected light that has passed through folding hologram element 42 enters (transmits to) emission hologram element 43, emission hologram element 43 emits, at a predetermined emission angle, third deflected light (image light) obtained by deflecting the incident second deflected light by diffraction. Specifically, when the second deflected light obtained as a result of folding hologram element 42 deflecting the first deflected light by diffraction propagates inside light guide 30 in the Y-axis negative direction, emission hologram element 43 deflects the second deflected light by diffraction according to its diffraction efficiency to emit third deflected light propagating in the Z-axis positive direction. Here, emission hologram element 43 functions to further stretch the image of the second deflected light that has been stretched in the X-axis direction, in the Y-axis direction. Thus, by further stretching, in the Y-axis direction, the image represented by the image light emitted from image generation device 20, emission hologram element 43 can emit the image light of the image enlarged in the X-axis direction and the Y-axis direction. Emission hologram element 43 emits the third deflected light, i.e. image light, in the Z-axis positive direction. The image light is emitted from emission surface 31*b*. The image light emitted from emission surface 31*b* is then incident on windshield 3.

The diffraction efficiency of emission hologram element 43 may be set lower when it is closer to folding hologram element 42 and higher when it is farther from folding hologram element 42.

The emission angle of the third deflected light emitted from the emission surface of emission hologram element 43 is the angle of the emitted light relative to the normal to the emission surface of emission hologram element 43.

Emission hologram element 43 may diverge the emitted image light so that the third deflected light will vary in emission angle. When deflecting the incident image light by diffraction, emission hologram element 43 may vary the emission angle depending on the position (part) on emission hologram element 43. Hence, emission hologram element 43 can vary the emission angle of part of the image light deflected by emission hologram element 43 by diffraction.

<Operation>

In display device 1 described above, image light emitted from the emission surface of image generation device 20 is incident on incidence surface 31*a* of light guide plate 31, propagates inside light guide 30, and is incident on incidence hologram element 41. The image light incident on incidence hologram element 41 is deflected by diffraction in incidence hologram element 41, and as a result is emitted from incidence hologram element 41 as first deflected light. The first deflected light emitted from incidence hologram element 41 is incident on folding hologram element 42. Part of the first deflected light is deflected by diffraction and emitted from folding hologram element 42 as second deflected light, and the rest of the first deflected light is reflected off the front and rear surfaces while propagating through light guide plate 31 and is incident on folding hologram element 42 again. As a result of the first deflected light being deflected by diffraction again in folding hologram element 42 and emitted as the second deflected light, the image light emitted from image generation device 20 is stretched in the X-axis direction by folding hologram element 42. The second deflected light emitted from folding hologram element 42 is incident on emission hologram element 43. Part of the second deflected light is deflected by diffraction and emitted from emission hologram element 43 as third deflected light, and the rest of the second deflected light is reflected off the front and rear surfaces while propagating through light guide plate 31 and is incident on emission hologram element 43 again. As a result of the second deflected light being deflected by diffraction again in emission hologram element 43 and emitted as the third deflected light, the second deflected light stretched in the X-axis direction by folding hologram element 42 is stretched in the Y-axis direction by emission hologram element 43. The image represented by the image light emitted from image generation device 20 is thus enlarged. The second deflected light is deflected by diffraction again in emission hologram element 43 and as a result emitted from emission hologram element 43 as the third deflected light, and the third deflected light (image light) is emitted from emission surface 31*b*.

Thus, emission hologram element 43 emits non-rectangular quadrilateral image light toward windshield 3 of vehicle 2. Windshield 3 transforms the incident non-rectangular quadrilateral image light into rectangular image light and reflects the rectangular image light. The image light reflected off windshield 3 travels to the eyebox of the user of vehicle 2.

This allows the user to see the virtual image displayed by display device 1 in a state of being superimposed on the view ahead as viewed through windshield 3 in the traveling direction of vehicle 2.

<Functions and Effects>

The functions and effects of display device 1 in this embodiment will be described below.

For example, when the virtual image generation device in PTL 1 is used as a head-up display (HUD), light emitted from an emission hologram and representing an image is projected onto the windshield. Here, since the windshield has a curved shape, it is preferable to shape the emission hologram to correspond to the curved shape of the windshield. However, the light emitted from the rectangular emission hologram in the virtual image generation device in PTL 1 and representing an image contains light representing an image that is not used. This causes a decrease in light utilization efficiency.

As described above, display device 1 according to this embodiment is display device 1 that displays a virtual image by projecting an image onto a display medium (windshield 3) provided on a mobile body (vehicle 2) and having a curved shape, including: image generation device 20 that generates light (image light) representing the image; and light guide 30 that includes a first hologram element (emission hologram element 43) having a non-rectangular quadrilateral shape. The first hologram element emits, toward the display medium, the light representing the image and propagating through light guide 30.

For example, image light emitted from a rectangular emission hologram as indicated by the dash-dot-dot lines in FIG. 4B contains light unrelated to virtual image display on the windshield as indicated by the diagonal hatching in FIG. 4B. The light utilization efficiency of light emitted from a rectangular emission hologram and representing an image is therefore low.

According to this embodiment, emission hologram element 43 can be shaped as a non-rectangular quadrilateral to correspond to curved windshield 3. Hence, the non-rectangular image light emitted from emission hologram element 43 is, as a result of being reflected off windshield 3, turned into the same shape as the outline of the image light emitted from image generation device 20, i.e. rectangular, as illustrated in FIG. 4C. Display device 1 can thus emit image light that is more related to virtual image display on windshield 3 than in conventional technology.

Therefore, display device 1 can suppress a decrease in the utilization efficiency of light emitted from emission hologram element 43 and representing an image.

In particular, display device 1 according to this embodiment can suppress the generation of stray light because light unrelated to virtual image display on windshield 3 is less likely to be emitted than in conventional technology.

In display device 1 according to this embodiment, backmost side 43*a* of four sides of the first hologram element is inclined relative to a left-right direction, the left-right direction being a direction parallel to an entire width of the mobile body and orthogonal to a front direction and a back direction, the front direction being a direction parallel to an entire length of the mobile body from inside of the mobile body toward outside of the mobile body through the display medium, and the back direction being a direction opposite to the front direction.

For example, if the emission hologram element is situated between the backmost side and the edge of the light guide, light unrelated to virtual image display on the windshield is emitted.

According to this embodiment, backmost side 43*a* is inclined in accordance with curved windshield 3, with it being possible to prevent emission hologram element 43 from being situated between backmost side 43*a* and the edge of light guide 30. In this way, the emission of light unrelated to virtual image display on windshield 3 can be suppressed.

In display device 1 according to this embodiment, in a plan view of the first hologram element, backmost side 43*a* is inclined clockwise relative to the left-right direction when the image is projected onto the display medium on a right side of the mobile body, and inclined counterclockwise relative to the left-right direction when the image is projected onto the display medium on a left side of the mobile body.

Accordingly, on windshield 3 on the right side of vehicle 2, image light is reflected with backmost side 43*a*, which is inclined clockwise relative to the left-right direction, being rotated counterclockwise. On windshield 3 on the left side of vehicle 2, image light is reflected with backmost side 43*a*, which is inclined counterclockwise relative to the left-right direction, being rotated clockwise. As a result, a rectangular image having the same shape as the outline of the image light emitted from image generation device 20 can be projected onto windshield 3. Such an image projected onto windshield 3 can be displayed without distortion.

In display device 1 according to this embodiment, frontmost side 43*b* of the four sides of the first hologram element is inclined in a same direction as backmost side 43*a* relative to the left-right direction.

For example, if emission hologram element 43 is situated between frontmost side 43*b* and the edge of light guide 30, light unrelated to virtual image display on windshield 3 is emitted.

According to this embodiment, frontmost side 43*b* is inclined in accordance with curved windshield 3, with it being possible to prevent emission hologram element 43 from being situated between frontmost side 43*b* and the edge of light guide 30. In this way, the emission of light unrelated to virtual image display on windshield 3 can be suppressed.

In display device 1 according to this embodiment, the first hologram element emits non-rectangular quadrilateral light representing the image toward the display medium of the mobile body, and the display medium transforms the non-rectangular quadrilateral light incident thereon into rectangular light representing the image and reflects the rectangular light.

Thus, the non-rectangular quadrilateral image light emitted from emission hologram element 43 can be transformed into rectangular image light as a result of being reflected off curved windshield 3. Consequently, the rectangular image light is incident on the eyebox of the user, so that the user can easily recognize the virtual image projected on windshield 3.

In display device 1 according to this embodiment, light guide 30 further includes a second hologram element (folding hologram element 42) and a third hologram element (incidence hologram element 41) that each have a rectangular shape. The second hologram element, when the light representing the image and emitted from image generation device 20 is incident thereon, deflects by diffraction the light representing the image and propagates, inside light guide 30, the light representing the image and deflected. The third hologram element deflects by diffraction the light representing the image and deflected by the second hologram element and propagates, inside light guide 30, the light representing the image and deflected. The first hologram element deflects by diffraction the light representing the image and deflected by diffraction by the third hologram element, and emits the light representing the image and deflected to outside light guide 30.

Thus, the image represented by the image light emitted from image generation device 20 can be increased in size by incidence hologram element 41, folding hologram element 42, and emission hologram element 43 and projected onto windshield 3. In this way, an image large enough to be visible to the user can be displayed.

(Variation 1 of Embodiment)

This variation differs from the embodiment in that display device 1*a* rotates. The other components in this variation are the same as those of the display device according to the embodiment unless otherwise noted. The same components are given the same reference signs and their detailed description is omitted.

The structure of display device 1*a* will be described with reference to FIGS. 5 to 7.

Figure 5:
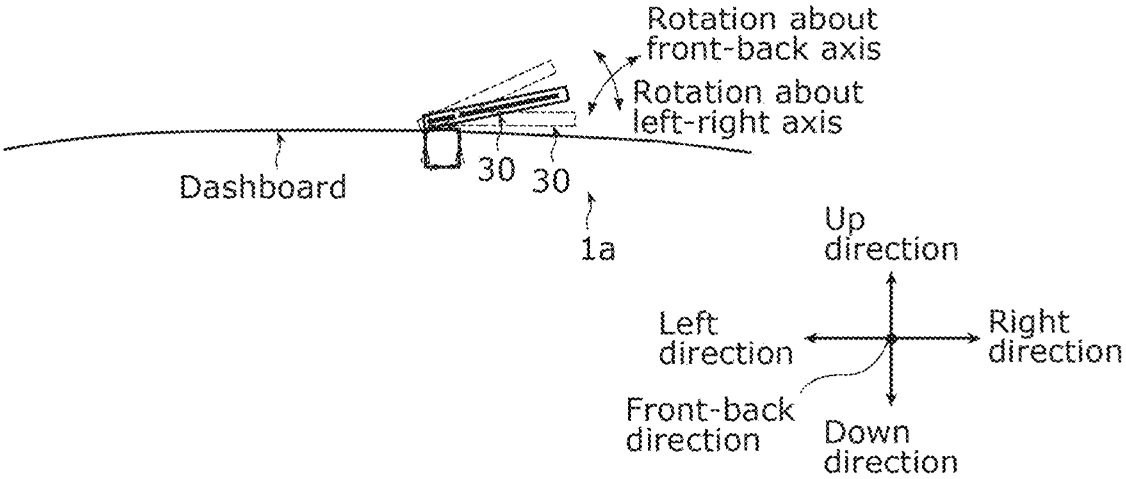
FIG. 5 is a schematic diagram illustrating a rotating display device according to Variation 1 of the embodiment and a vehicle as viewed in the front direction.

FIG. 5 is a schematic diagram illustrating rotating display device 1*a* according to Variation 1 of the embodiment and vehicle 2 as viewed in the front direction. FIG. 6 is a schematic diagram illustrating rotating light guide 30 according to Variation 1 of the embodiment and vehicle 2 as viewed in the front direction. FIG. 7 is a schematic diagram illustrating the posture of rotated display device 1*a*.

Figure 6:
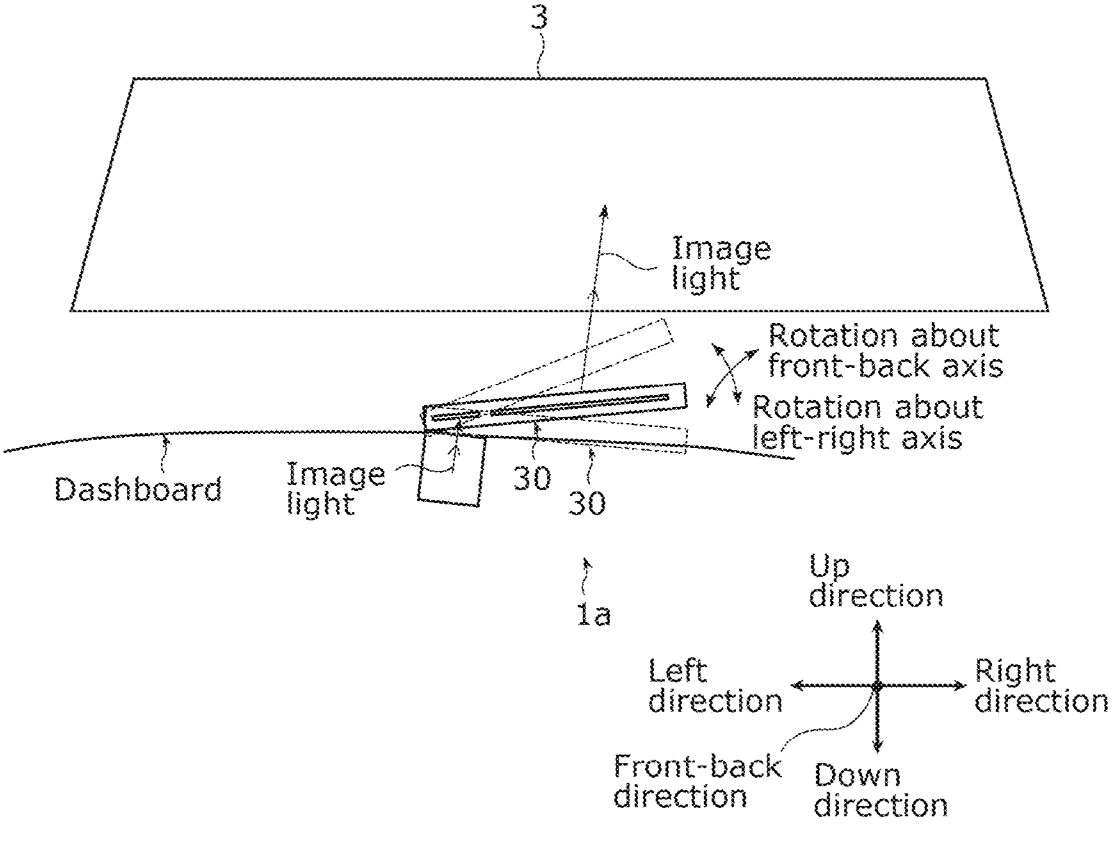
FIG. 6 is a schematic diagram illustrating a rotating light guide according to Variation 1 of the embodiment and the vehicle as viewed in the front direction.

In this variation, at least light guide 30 can rotate about a left-right axis (i.e. an axis in the left-right direction) and rotate about a front-back axis (i.e. an axis in the front-back direction), as illustrated in FIGS. 5 and 6.

For example, as illustrated in FIG. 5, entire display device 1*a* may rotate about the left-right axis from a posture in which the surface of light guide 30 is parallel to a horizontal plane so as to be inclined relative to the horizontal plane, and entire display device 1*a* may rotate about the front-back axis from a posture in which the surface of light guide 30 is parallel to a horizontal plane so as to be inclined relative to the horizontal plane.

Alternatively, as illustrated in FIG. 6, only light guide 30 in display device 1*a* may rotate about the front-back axis from a posture in which the surface of light guide 30 is parallel to a horizontal plane so as to be inclined relative to the horizontal plane, and only light guide 30 in display device 1*a* may rotate about the left-right axis from a posture in which the surface of light guide 30 is parallel to a horizontal plane so as to be inclined relative to the horizontal plane. In this case, image generation device 20 is fixed to vehicle 2 and is non-rotating.

When projecting an image onto windshield 3 on the right side of vehicle 2, light guide 30 as viewed in the front direction may be inclined clockwise about the front-back axis from a state of being parallel to the left-right direction. In other words, when display device 1*a* is located on the right side of vehicle 2, light guide 30 may be in a posture inclined clockwise from a state of being parallel to the left-right direction.

When projecting an image onto windshield 3 on the left side of vehicle 2, light guide 30 as viewed in the front direction may be inclined counterclockwise about the front-back axis from a state of being parallel to the left-right direction. In other words, when display device 1*a* is located on the left side of vehicle 2, light guide 30 may be in a posture inclined counterclockwise from a state of being parallel to the left-right direction.

Figure 7:
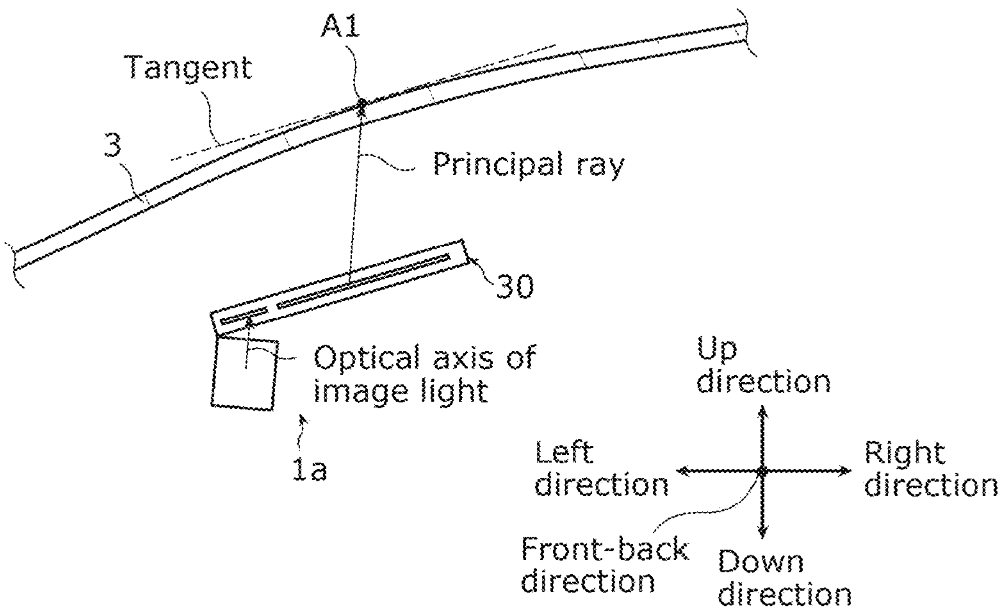
FIG. 7 is a schematic diagram illustrating the posture of the rotated display device.

As illustrated in FIG. 7, light guide 30 as viewed in the front direction is disposed so as to approach a posture approximately parallel to a tangent to windshield 3 at intersection A1 between windshield 3 and the principal ray of the image light emitted from light guide 30. Specifically, at least light guide 30 can be inclined in posture so that a plane tangent to intersection A1 and the surface of light guide 30 will be approximately parallel to each other.

The posture of at least light guide 30 is adjusted in this way to cause the optical axis of the light emitted from image generation device 20 and representing an image and the principal ray of the light emitted from light guide 30 and representing the image to be approximately parallel to each other.

In display device 1*a* according to this variation, at least light guide 30 rotates about a front-back axis from a posture in which a surface of light guide 30 is parallel to a horizontal plane, so as to be inclined relative to the horizontal plane.

Thus, in the case where entire display device 1*a* rotates, the posture of display device 1*a* can be adjusted so that the irradiation direction of the image light emitted from image generation device 20 and the irradiation direction of the image light emitted from light guide 30 will be parallel to each other. This can suppress blurring of the image projected on windshield 3.

In the case where only light guide 30 rotates, the posture of light guide 30 relative to image generation device 20 can be changed. Thus, the posture of light guide 30 can be adjusted so that the irradiation direction of the image light emitted from image generation device 20 and the irradiation direction of the image light emitted from light guide 30 will be parallel to each other. This can suppress blurring of the image projected on windshield 3.

In display device 1*a* according to this variation, light guide 30 as viewed in the front direction is inclined clockwise from a state of being parallel to the left-right direction when the image is projected onto the display medium on a right side of the mobile body, and inclined counterclockwise from the state of being parallel to the left-right direction when the image is projected onto the display medium on a left side of the mobile body.

For example, when the curvature of the windshield on the left or right side is greater, the windshield and the light guide are less parallel to each other, so that the acute angle of the non-rectangular quadrilateral shape of the emission hologram element tends to be smaller. In this case, the emission hologram element increases in length, causing the light guide to increase in size.

According to this variation, the posture of light guide 30 can be adjusted so that light guide 30 and windshield 3 will be approximately parallel to each other. This can prevent the acute angle of the non-rectangular quadrilateral shape of emission hologram element 43 from being excessively small. As a result, the increase in length of emission hologram element 43 is suppressed, with it being possible to suppress the increase in size of light guide 30.

In display device 1*a* according to this variation, light guide 30 as viewed in the front direction is disposed to approach a posture approximately parallel to a tangent to the display medium at intersection A1 between the display medium and a principal ray of the light representing the image and emitted from light guide 30.

According to this variation, light guide 30 can be disposed so that the surface of light guide 30 and windshield 3 will be approximately parallel to each other. This can more reliably prevent the acute angle of the non-rectangular quadrilateral shape of emission hologram element 43 from being excessively small. As a result, the increase in length of emission hologram element 43 is suppressed, with it being possible to suppress the increase in size of light guide 30 more reliably.

In display device 1*a* according to this variation, an optical axis of the light representing the image and emitted from image generation device 20 and a principal ray of the light representing the image and emitted from light guide 30 are approximately parallel to each other.

If the optical axis of the light representing the image and emitted from the image generation device and the principal ray of the light representing the image and emitted from the light guide are not parallel to each other, the direction of the incidence angle of the image light emitted from the image generation device onto the light guide and the direction of the emission angle of the principal ray of the image light emitted from the light guide are not parallel to each other. This causes blurring of the image projected on the windshield.

Display device 1*a* according to this variation can suppress such blurring of the image projected on windshield 3.

(Variation 2 of Embodiment)

This variation differs from the embodiment in that emission hologram element 43 in display device 1*b* is located so that backmost side 43*a* of emission hologram element 43 will be approximately parallel to the longitudinal direction of folding hologram element 42. The other components in this variation are the same as those of the display device according to the embodiment unless otherwise noted. The same components are given the same reference signs and their detailed description is omitted.

The structure of light guide 30 in display device 1*b* will be described with reference to FIG. 8.

Figure 8:
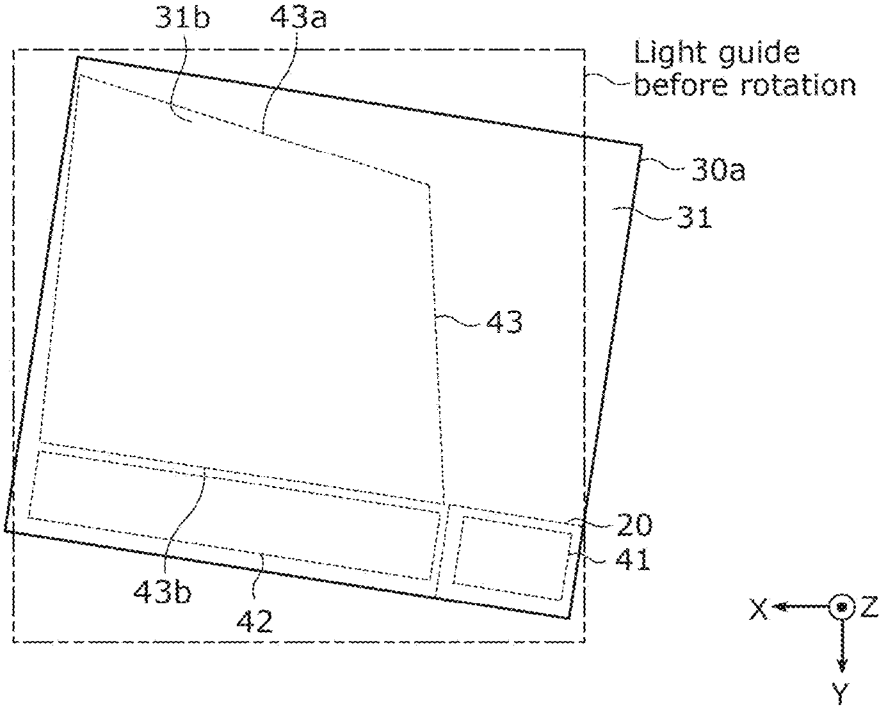
FIG. 8 is a plan view illustrating a light guide in a display device according to Variation 2 of the embodiment.

FIG. 8 is a plan view illustrating light guide 30*a* in display device 1*b* according to Variation 2 of the embodiment.

In this variation, light guide 30*a* is rotated clockwise or counterclockwise on the X-axis direction and the Y-axis direction relative to the posture in which the surface of light guide 30*a* is approximately parallel to the X-Y plane, compared to a pre-rotation light guide as in the embodiment indicated by the dash-dot-dot lines. In other words, light guide 30*a* is rotated clockwise or counterclockwise about the Z-axis, compared to a pre-rotation light guide as in the embodiment. Emission hologram element 43 according to this variation is located at approximately the same position in vehicle 2 as the emission hologram element according to the embodiment.

Specifically, when display device 1*b* is located on the right side of vehicle 2, display device 1*b* excluding emission hologram element 43 is disposed in a state of being rotated clockwise about the Z-axis.

When display device 1*b* is located on the left side of vehicle 2, display device 1*b* excluding emission hologram element 43 is disposed in a state of being rotated counterclockwise about the Z-axis.

Emission hologram element 43 is placed inside light guide plate 31 in such a posture that frontmost side 43*b* or backmost side 43*a* of emission hologram element 43 is approximately parallel to the longitudinal direction which is parallel to the long side of folding hologram element 42. In FIG. 8, emission hologram element 43 is placed inside light guide plate 31 in such a posture that backmost side 43*a* approaches being parallel to the long side of folding hologram element 42. Moreover, emission hologram element 43 is placed inside light guide plate 31 with frontmost side 43*b* orthogonal to the second deflected light emitted from folding hologram element 42.

In display device 1*b* according to this variation, the second hologram element is elongated in a left-right direction that is a direction parallel to an entire width of the mobile body, and the first hologram element is disposed inside light guide 30 with backmost side 43*a* of four sides of the first hologram element approximately parallel to a long side of the second hologram element.

This makes it possible to reduce the space between backmost side 43*a* and folding hologram element 42. Thus, an increase in size of light guide plate 31 can be suppressed compared to the case where emission hologram element 43 is placed inside light guide 30 so that backmost side 43*a* and folding hologram element 42 will not be parallel to each other.

(Other Variations)

While the display device according to the present disclosure has been described above by way of the embodiments, the present disclosure is not limited to these embodiments. Other modifications obtained by applying various changes conceivable by a person skilled in the art to each embodiment without departing from the scope of the present disclosure are also included in the present disclosure.

Other modifications obtained by applying various changes conceivable by a person skilled in the art to each embodiment and any combinations of the elements and functions in each embodiment without departing from the scope of the present disclosure are also included in the present disclosure.

While various embodiments have been described herein above, it is to be appreciated that various changes in form and detail may be made without departing from the spirit and scope of the present disclosure as presently or hereafter claimed.

FURTHER INFORMATION ABOUT TECHNICAL BACKGROUND TO THIS APPLICATION

The disclosures of the following patent applications including specification, drawings, and claims are incorporated herein by reference in their entirety: Japanese Patent Application No. 2022-059851 filed on Mar. 31, 2022, and PCT International Application No. PCT/JP2023/005250 filed on Feb. 15, 2023.

INDUSTRIAL APPLICABILITY

The presently disclosed technique can be used in vehicle head-up display devices, etc.

The invention claimed is:

1. A display device that displays a virtual image by projecting an image onto a display medium provided on a mobile body and having a curved shape, the display device comprising:

an image generation device that generates light representing the image; and a light guide that includes a first hologram element having a non-rectangular quadrilateral shape, wherein the first hologram element emits, toward the display medium, the light representing the image and propagating through the light guide.

2. The display device according to claim 1, wherein a backmost side of four sides of the first hologram element is inclined relative to a left-right direction, the left-right direction being a direction parallel to an entire width of the mobile body and orthogonal to a front direction and a back direction, the front direction being a direction parallel to an entire length of the mobile body from inside of the mobile body toward outside of the mobile body through the display medium, and the back direction being a direction opposite to the front direction.

3. The display device according to claim 2, wherein in a plan view of the first hologram element, the backmost side is inclined clockwise relative to the left-right direction when the image is projected onto the display medium on a right side of the mobile body, and inclined counterclockwise relative to the left-right direction when the image is projected onto the display medium on a left side of the mobile body.

4. The display device according to claim 2, wherein a frontmost side of the four sides of the first hologram element is inclined in a same direction as the backmost side relative to the left-right direction.

5. The display device according to claim 2, wherein at least the light guide rotates about a front-back axis from a posture in which a surface of the light guide is parallel to a horizontal plane, so as to be inclined relative to the horizontal plane.

6. The display device according to claim 5, wherein the light guide as viewed in the front direction is inclined clockwise from a state of being parallel to the left-right direction when the image is projected onto the display medium on a right side of the mobile body, and inclined counterclockwise from the state of being parallel to the left-right direction when the image is projected onto the display medium on a left side of the mobile body.

7. The display device according to claim 5, wherein the light guide as viewed in the front direction is disposed to approach a posture approximately parallel to a tangent to the display medium at an intersection between the display medium and a principal ray of the light representing the image and emitted from the light guide.

8. The display device according to claim 1, wherein the first hologram element emits non-rectangular quadrilateral light representing the image toward the display medium of the mobile body, and the display medium transforms the non-rectangular quadrilateral light incident thereon into rectangular light representing the image and reflects the rectangular light.

9. The display device according to claim 1, wherein an optical axis of the light representing the image and emitted from the image generation device and a principal ray of the light representing the image and emitted from the light guide are approximately parallel to each other.

10. The display device according to claim 1, wherein the light guide further includes a second hologram element and a third hologram element that each have a rectangular shape, the second hologram element, when the light representing the image and emitted from the image generation device is incident thereon, deflects by diffraction the light representing the image and propagates, inside the light guide, the light representing the image and deflected, the third hologram element deflects by diffraction the light representing the image and deflected by the second hologram element and propagates, inside the light guide, the light representing the image and deflected, and the first hologram element deflects by diffraction the light representing the image and deflected by diffraction by the third hologram element, and emits the light representing the image and deflected to outside the light guide.

11. The display device according to claim 10, wherein the second hologram element is elongated in a left-right direction that is a direction parallel to an entire width of the mobile body, and the first hologram element is disposed inside the light guide with a backmost side of four sides of the first hologram element approximately parallel to a long side of the second hologram element.

* * * * *